May 6, 1958  C. A. HUPRICH  2,832,976
METHOD OF FORMING A RESIN-IMPREGNATED SHOE SHANK STIFFENER
Filed Oct. 3, 1956

INVENTOR
Carl A. Huprich
BY *W. H. Rambo*
ATTORNEY

United States Patent Office 2,832,976
Patented May 6, 1958

2,832,976

METHOD OF FORMING A RESIN-IMPREGNATED SHOE SHANK STIFFENER

Carl A. Huprich, Carbon Hill, Ohio

Application October 3, 1956, Serial No. 613,654

4 Claims. (Cl. 12—146)

The present invention relates generally to shoe construction and more particularly to an improved shank stiffener construction for shoes and method of employing same.

In the past, it has been proposed to employ, as a substitute for the usual metal, wood or fiberboard shoe shank stiffener, a body consisting of woven, felted or matted fibrous glass impregnated or coated with a substantially rigid synthetic resin. It has been found, however, that considerable labor and difficulty is involved in the use of woven fabric, felted or matted fiber glass bodies as shoe shank stiffeners, as it is necessary to provide a multiplicity of different sizes and patterns of such shank stiffeners in conformity with the various different sizes of shoes in which the stiffeners are to be incorporated. Thus, the shoe manufacturer is required to maintain a sizeable and sometimes burdensome inventory of pre-cut and accurately sized stiffener blanks ready for assembly within shoes of various sizes during given operational runs. Also, woven, felted or matted-type fiber glass shank stiffeners, due to the more or less random disposition of the individual fibers contained therein, often fail to provide sufficient strength in the areas and directions necessary for an efficient shoe shank stiffener. Further, such woven, felted or matted-types of fiber glass shank stiffeners, due to bulk and preformed pattern, often require the formation of special recesses or cavities in the insole, intermediate sole or outsole components of the shoe to properly index and maintain the stiffener in its desired position within the shoe. All of the foregoing objectionable features of prior art fiber glass shank stiffeners contribute to making shoe manufacture more complicated, laborious, and expensive.

It follows, therefore, that the primary object of the present invention is to provide an improved, more efficient and less expensive shoe shank stiffener and method of assembling the same within a shoe.

Another object of this invention is to provide a shoe shank stiffener which is composed of a plurality of separate roves or strands of flexible, fibrous material impregnated or saturated with a liquid, hardenable, synthetic resin, adapted to be laid and shaped in substantially parallel, adjacent rows between the shank portions of the insole and outsole of a shoe during assembly of the shoe, and which sets or hardens to a substantially inflexible condition after assembly within the shoe and during subsequent assembly or constructional operations performed thereon, without substantial interruption or modification to the usual shoe making operations.

A further object of the present invention is to provide a simplified, yet mechanically efficient, method of forming and assembling a resin-impregnated, fibrous material shoe shank stiffener within an associated shoe construction during the usual steps comprising the shoe making operation, and causing the resin-impregnated stiffening material to set and harden to a substantially inflexible condition during or immediately following the shoe making operation.

Yet another object of the invention is to provide a shoe shank stiffener material which, at the time of its assembly within the shoe construction, comprises a plurality of separate, liquid resin-impregnated strands or roves of flexible fibrous material, such as fiber glass, adapted to be individually or collectively laid in substantially parallel order over the shank portion of the insole of the shoe prior to the application of the outsole thereto, and conformed to the desired shape and size of the shank portion of such insole, thereby eliminating the necessity of precutting and preshaping the shank stiffener material as required in prior art methods and processes.

For a further understanding of the present invention and the various additional objects and advantages ambient thereto, reference is made to the following description and the accompanying drawing, wherein.

In accordance with the present invention, I provide a shoe shank stiffener material in the form of roving or twisted strands of a flexible fibrous material such as fibrous glass or the equivalent, which, prior to assembly within an associated shoe, is immersed in or otherwise dipped, sprayed, coated and impregnated with a bath of liquid, thermosetting synthetic resin catalyzed with a suitable polymerization catalyst operable to cause the complete polymerization or curing of the resin to a hard, substantially inflexible state, within a period of time sufficient to permit of the assembly of the roves or strands between the insole and outsole components of the shoe and the completion of the shoe construction.

Figure 1:
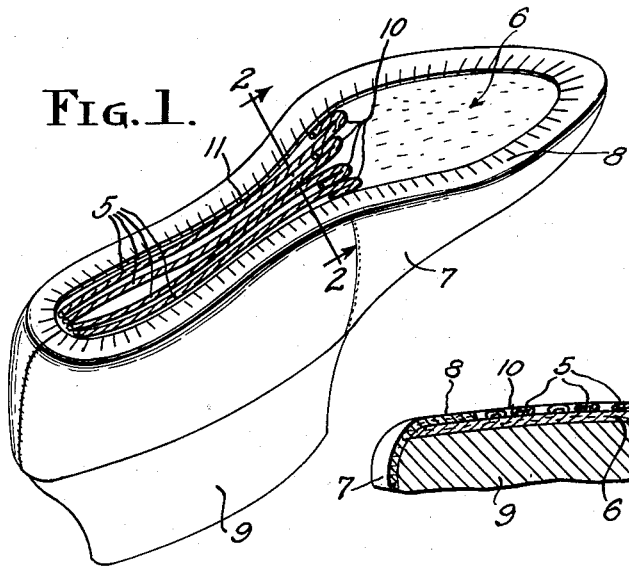
Fig. 1 is a perspective view of the shoe upper and insole portions of a shoe mounted upon a last, and illustrating the present shoe shank stiffener material in its operative position upon the insole of the shoe.
Figure 2:
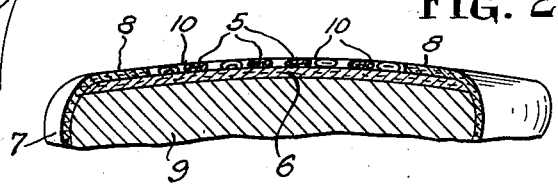
Fig. 2 is an enlarged fragmentary vertical sectional view taken along the line 2—2 of Fig. 1.

Figs. 1 and 2 of the drawings disclose at 5 a plurality of separate strands or roves of liquid resin-impregnated flexible fibrous material positioned in substantially parallel relative order upon and coextensive with the heel and shank portions of the insole 6 of a shoe at the stage of construction of the shoe wherein the shoe upper 7, and its inturned welt-attaching marginal flange 8 and insole 6 are assembled together and mounted upon an associated supporting last 9. At the time of laying the strands or roves 5, the outsole of the shoe, not shown, has not been assembled upon the shoe. As will be seen in Fig. 1, the strands or roves 5 extend substantially from the heel portion of the insole forwardly through the shank portion thereof substantially to the forepart of the insole. Advantageously, when desired, the forward ends of the strands 5 may be turned backwardly on themselves, as at 10, to provide a relatively laterally extended or "fanned out" area of stiffener material at the approximate juncture of the shank portion and forepart of the insole 6.

As normally constructed, the inner marginal edge of the welt-attaching portion 8 of the upper 7 defines a relatively narrow throat portion 11 at the central shank portion of the insole 6, and the resin-impregnated strands 5 may be relatively closely spaced or bunched together so as to fit neatly and flatly between the opposed edges of the flange 8 of the upper in this region, with the respective end portions of the strands 5 being relatively more widely spaced from one another at the heel and forward shank portions of the insole 6.

At the time of laying or applying the strands 5 upon the insole 6, the same are readily flexible, with the liquid resin applied thereto being in the form of a tacky viscous substance, permitting of the desired shaping of the strands in conformity with the shank portion of the insole. Due to the tacky and adhesive nature of the resin, with which the strands 5 are saturated, such resin functions, prior to curing, to adhesively secure the strands in their desired positions upon the insole of the shoe, and thereafter the shoe construction may be completed through the addition of an appropriate welt strip and/or outsole, not shown.

Figure 3:
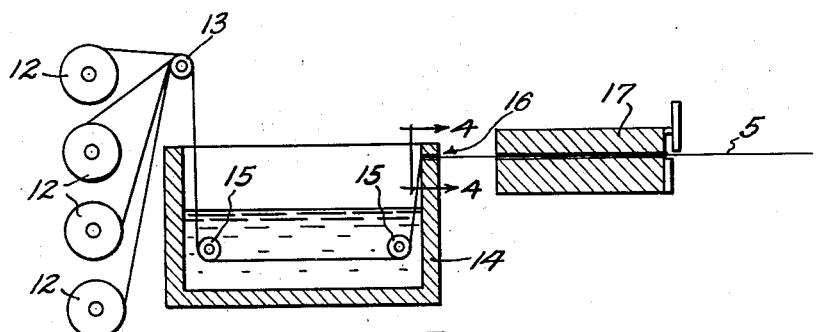
Fig. 3 is a diagrammatic view illustrating the steps of resin-impregnating and cutting the strands of flexible fibrous material prior to their application to the shank portion of a shoe.
Figure 4:
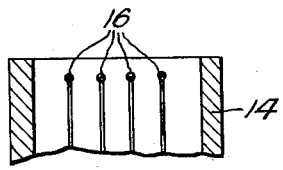
Fig. 4 is a fragmentary vertical sectional view taken along the line 4—4 of Fig. 3.

Fig. 3 of the drawing illustrates diagrammatically a preferable method and means employed in saturating or impregnating the flexible fibrous roving or strands with the catalyzed synthetic resin. In this latter figure, the numeral 12 designates a plurality of supply spools or drums about which are wound continuous lengths of fiber glass, or equivalent flexible fibrous material, roving. The individual roves or strands emanating from the supply rolls 12 are trained over a guide roller 13 from whence the same are directed downwardly into a vat or reservoir 14 containing the liquid thermosetting synthetic resin and catalyst.

Suitable guide rolls 15 are provided in the bottom portion of the reservoir 14, under which the strands of roving may be passed and guided in immersed condition through the bath of resin and catalyst. From the rollers 15 the strands of roving are passed through relatively restricted orifices 16 formed in the side wall of the reservoir 14, whereby to remove from the strands or roves excess quantities of liquid resin carried thereby. From the orifices 16, the individual strands of roving are passed through a suitable shear-type cutting apparatus 17 operable to sever or cut the strands into desired lengths. Following the cutting of the roves or strands 5 to their desired length, the same are laid upon and conformed to the shank portion of the insole of the shoe, as illustrated in Figs. 1 and 2, and thereafter the shoe construction is completed by the addition of an outsole through stitching and/or cementing the same in the usual manner.

Depending upon the type of liquid thermosetting synthetic resin and catalyst used, and the relative quantities thereof, such resin may be caused to polymerize or cure to a hardened inflexible state either at ordinary room temperatures or at slightly elevated temperatures in a period of time ranging from say five minutes to one hour. In this regard, I have found it preferable to employ a liquid polyester-type thermosetting synthetic resin, such as that derived as a reaction product of allylalcohol wih phthalic anhydride. Where it is desired to accomplish the polymerization of the polyester resin at room temperatures, I employ a catalyst composed of a mixture of methyl, ethyl ketone with a six percent (6%) cobalt solution. The uncured polyester resin possesses the desired viscous liquid properties, and efficiently wets and impregnates the strands of flexible fibrous glass as the same are passed through the bath, and the methyl, ethyl ketone-cobalt catalyst, when mixed with the resin in the reservoir 14, functions to cause complete polymerization or curing of the resin at ordinary room temperatures within a period of time sufficient to complete the assembly of the resin-impregnated strands between the insole and outsole portions of the shoe and the subsequent finishing operations required to complete the shoe.

In the construction of certain types or forms of shoes, wherein the outsole is adhesively secured or cemented to the insole of the shoe under heat and pressure, a polymerization catalyst other than methyl, ethyl ketone-cobalt may be employed by reason of the external heat and pressure imparted to the resin during the usual cementing operation employed in securing the outsole to the shoe. For example, I may employ a polymerization catalyst such as benzoyl peroxide, lauryl peroxide, or cumene hydroperoxide. These latter three catalysts function efficiently to accelerate the polymerization and curing of the polyester resin when the same is subjected to relatively elevated temperatures of the order of 220° F. for a period of approximately twenty minutes, and such temperatures are ordinarily attained during the cementing and pressing of the outsole to and against the insole portion of the shoe.

I have also found that other liquid thermosetting synthetic resins may be employed in lieu of the polyester resins with substantially equal result. For example, the epoxy and furan-type resins may be used in admixture with a suitable polymerizing catalyst. An example of an epoxy-type resin is the reaction product obtained from bis-phenol with epichlorohydrin. With the epoxy resins, an amine-type catalyst, such as triethanolamine, is employed. A preferable form of furan-type resin usable herein is exemplified by furfural alcohol which may be catalyzed with a suitable mineral acid catalyst such as acetic, sulphric, hydrochloric or phosphoric acids.

As will be readily understood, the disposition of the resin-saturated or impregnated roves or strands 5 in substantially longitudinal coextensive order upon the shank portion of the insole, and the subsequent hardening of the strands in situ between the insole and outsole components of the shoe provides a highly desirable and efficient strength pattern capable of readily absorbing ordinary stresses and strains to which the shank portion of the shoe is subjected by the user, as compared with the random disposition of the fibers comprising woven, felted, or matted shank stiffener bodies heretofore employed in shoe construction. In this connection, it will be understood that the purpose of the shank stiffener is to reinforce the shoe construction against bending at the shank or arch portion thereof, and hence the substantially unidirectional disposition of the strands or roving longitudinally of the shoe, function efficiently toward this end.

In view of the foregoing, it will be seen that the present invention provides an improved and efficient shoe shank stiffener material and method of assembling the same within an associated shoe during the construction of the latter. The shank stiffener and method of the present invention are characterized by their ease and economy of installation and operation. Additionally, shank stiffeners formed in accordance with the present invention may be readily assembled within the shoe construction without interruption or modification of the normal sequence of steps commonly employed in present day shoe construction methods.

I claim:

1. The method of constructing a shoe which comprises mounting a shoe upper and insole on a last; placing a plurality of strands of flexible fibrous material impregnated with a liquid, polymerizable synthetic resin upon the insole with the strands arranged in adjacent, substantially parallel order upon and substantially coextensive with the shank portion of the insole of the shoe; securing an outsole over the insole and resin-impregnated strands of fibrous material; and causing the resin carried by said strands to polymerize to a hardened state while in situ between the insole and outsole portions of the shoe.

2. The method defined in claim 1, wherein the flexible fibrous material is composed of fibrous glass roving.

3. The method defined in claim 1, wherein the synthetic resin comprises a liquid polyester resin catalyzed with methyl, ethyl ketone and a six percent (6%) cobalt solution, and wherein the polymerization of said resin is carried out at ordinary room temperature.

4. The method of providing a shoe with a shank stiffener which comprises: positioning a shoe upper and an insole upon a last; placing upon the outer surface of the shank portion of the insole a plurality of strands of flexible, fibrous glass substantially saturated with a liquid, polymerizable synthetic resin; shaping and arranging said strands in relatively closely spaced, substantially parallel, longitudinally extending order upon and coextensive with the shank portion of the insole; securing an outsole in coextensive relation to the insole to enclose said strands; and causing the resin carried by said strands to polymerize to a hardened state while in situ between the insole and outsole portions of the shoe.

References Cited in the file of this patent

UNITED STATES PATENTS

| | | |
|---|---|---|
| 235,541 | Leonard | Dec. 14, 1880 |
| 1,327,091 | Egerton | Jan. 6, 1920 |
| 2,425,707 | Wagner | Aug. 12, 1947 |
| 2,644,250 | Ciaio | July 7, 1953 |
| 2,653,396 | Gottlieb | Sept. 29, 1953 |